(12) United States Patent
Moriishi et al.

(10) Patent No.: US 10,629,970 B2
(45) Date of Patent: Apr. 21, 2020

(54) LITHIUM AIR BATTERY INCLUDING NEGATIVE ELECTRODE, POSITIVE ELECTRODE, NONAQUEOUS LITHIUM ION CONDUCTOR, AND COPPER ION

(71) Applicant: Panasonic Intellectual Property Management Co., Ltd., Osaka (JP)

(72) Inventors: Masako Moriishi, Osaka (JP); Yu Otsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 39 days.

(21) Appl. No.: 15/984,417

(22) Filed: May 21, 2018

(65) Prior Publication Data

US 2018/0358673 A1 Dec. 13, 2018

(30) Foreign Application Priority Data

Jun. 12, 2017 (JP) .................................. 2017-115196

(51) Int. Cl.
| | | |
|---|---|---|
| *H01M 4/86* | (2006.01) | |
| *H01M 4/90* | (2006.01) | |
| *H01M 12/08* | (2006.01) | |
| *H01M 12/02* | (2006.01) | |
| *H01M 4/38* | (2006.01) | |
| *H01M 10/0567* | (2010.01) | |

(52) U.S. Cl.
CPC ........... *H01M 12/08* (2013.01); *H01M 4/382* (2013.01); *H01M 4/8663* (2013.01); *H01M 4/9091* (2013.01); *H01M 10/0567* (2013.01); *H01M 12/02* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 2012/0264025 A1 | 10/2012 | Suto | |
| 2013/0323609 A1* | 12/2013 | Suto | H01M 6/04 429/403 |
| 2015/0349365 A1* | 12/2015 | Lee | H01M 8/102 429/492 |
| 2016/0190636 A1 | 6/2016 | Mizuno et al. | |

FOREIGN PATENT DOCUMENTS

| | | |
|---|---|---|
| JP | 2012-238591 | 12/2012 |
| JP | 2013-527567 | 6/2013 |
| JP | 2015-225859 | 12/2015 |
| JP | 2015-230801 | 12/2015 |
| JP | 2016-122650 | 7/2016 |
| WO | 2011/070658 | 6/2011 |
| WO | 2011/133982 | 10/2011 |

* cited by examiner

*Primary Examiner* — Yoshitoshi Takeuchi
(74) *Attorney, Agent, or Firm* — McDermott Will & Emery LLP

(57) ABSTRACT

A lithium air battery includes a negative electrode allowing a lithium ion to be occluded in the negative electrode and released from the negative electrode; a positive electrode configured to use oxygen in air as a positive electrode active material; a nonaqueous lithium ion conductor disposed between the negative electrode and the positive electrode; and a copper ion present in at least one selected from the group consisting of the positive electrode and the nonaqueous lithium ion conductor.

8 Claims, 2 Drawing Sheets

LITHIUM AIR BATTERY INCLUDING NEGATIVE ELECTRODE, POSITIVE ELECTRODE, NONAQUEOUS LITHIUM ION CONDUCTOR, AND COPPER ION

BACKGROUND

1. Technical Field

The present disclosure relates to a lithium air battery.

2. Description of the Related Art

A lithium air battery is a battery in which as a positive electrode active material, oxygen in the air is used, and as a negative electrode active material, a metal or a compound capable of occluding and releasing lithium ions is used. The lithium air battery has advantages in that the energy density is high, the size can be easily reduced, and the weight can also be easily reduced. Hence, the lithium air battery has drawn attention as a battery having a higher energy density than that of a lithium ion battery which has been currently considered to have the highest energy density.

In the lithium air battery, by a discharge reaction, lithium peroxide is precipitated on a positive electrode, and by a charge reaction, lithium peroxide is decomposed. Since the electron conductivity of lithium peroxide is low, the charge reaction is not likely to proceed. This property disturbs an improvement in cycle characteristics of the lithium air battery.

In order to efficiently decompose lithium peroxide, in an air battery disclosed in Japanese Unexamined Patent Application Publication (Translation of PCT Application) No. 2013-527567, an oxygen generation catalyst is contained in an electrolyte liquid. Since mediating the transfer of electrons between a positive electrode and lithium peroxide, the oxygen generation catalyst promotes the decomposition of lithium peroxide and lowers a charging potential. Japanese Patent No. 5943194 has disclosed that an oxidation activity of water is enhanced using a polynuclear metal complex.

SUMMARY

In one general aspect, the techniques disclosed here feature a lithium air battery comprising: a negative electrode allowing a lithium ion to be occluded in the negative electrode and released from the negative electrode; a positive electrode configured to use oxygen in air as a positive electrode active material; a nonaqueous lithium ion conductor disposed between the negative electrode and the positive electrode; and a copper ion present in at least one selected from the group consisting of the positive electrode and the nonaqueous lithium ion conductor.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
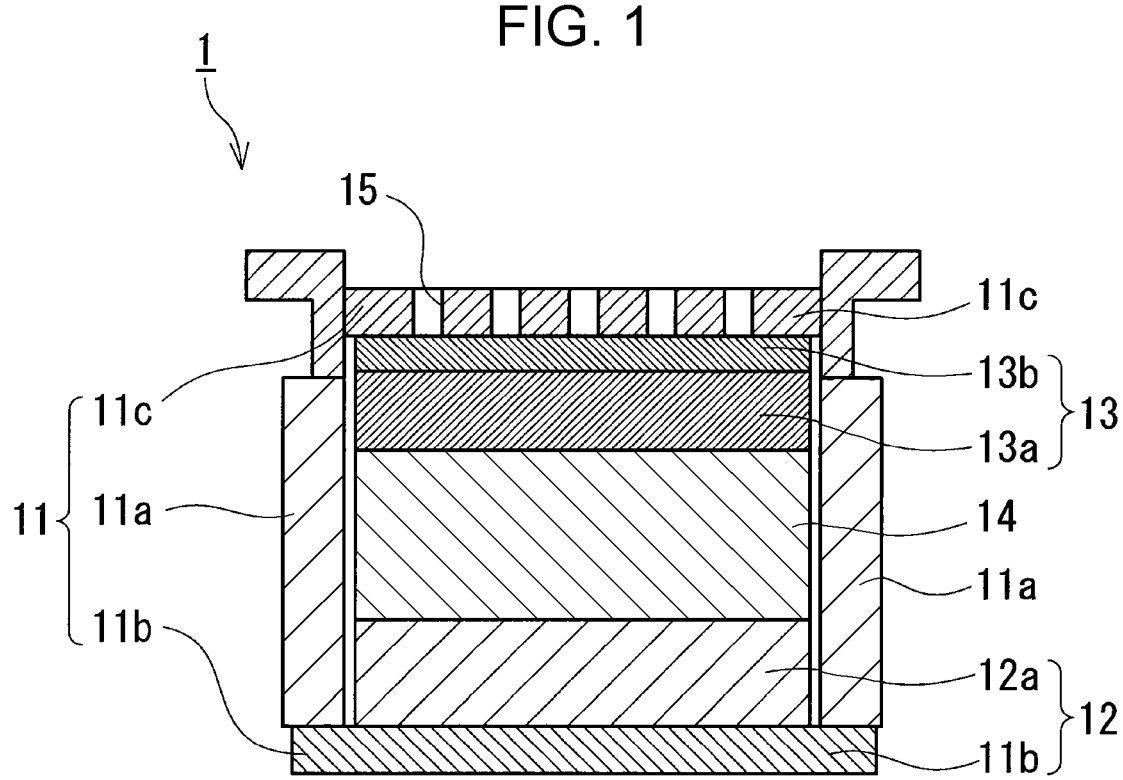
FIG. 1 is a schematic cross-sectional view of a lithium air battery according to one embodiment of the present disclosure.

DETAILED DESCRIPTION (Underlying Knowledge Forming Basis of the Present Disclosure)

Japanese Unexamined Patent Application Publication (Translation of PCT Application) No. 2013-527567 has not disclosed any thing about the cycle characteristics of the lithium air battery. Japanese Patent No. 5943194 has disclosed only an effect of improvement in oxidation activity of water in an aqueous air secondary battery.

A lithium air battery according to a first aspect of the present disclosure comprises:

a negative electrode allowing a lithium ion to be occluded in the negative electrode and released from the negative electrode;

a positive electrode configured to use oxygen in air as a positive electrode active material;

a nonaqueous lithium ion conductor disposed between the negative electrode and the positive electrode; and a copper ion present in at least one selected from the group consisting of the positive electrode and the nonaqueous lithium ion conductor.

According to the first aspect, the copper ion functions as a charging catalyst which efficiently decomposes lithium peroxide, and a charging potential is lowered. Since application of a high voltage to each member of the lithium air battery can be avoided, degradation of the member caused by oxidation can be suppressed, and hence, the cycle characteristics of the lithium air battery are also improved.

In particular; when copper iodide (CuI) is used as a compound containing copper ions, $Cu^+$ ions not only show a catalyst effect in an oxygen generation reaction, but iodide ions ($I^-$ ions) also form a LiI film on the surface of metal lithium functioning as the negative electrode. By the LiI film, the surface of the negative electrode is smoothed, and lithium is likely to be precipitated and dissolved. When lithium is likely to be precipitated and dissolved on the negative electrode, the growth of lithium dendrites which may probably cause short circuit is suppressed, and the cycle characteristics of the lithium air battery are improved.

In a second aspect of the present disclosure, for example, the copper ion of the lithium air battery according to the first aspect may be a monovalent copper ion. When the lithium air battery is charged, the monovalent copper ions are changed into divalent copper ions by oxidation performed on the surface of the positive electrode. The divalent copper ions function as a charging catalyst which promotes the decomposition of lithium peroxide.

In a third aspect of the present disclosure, for example, the lithium air battery according to the second aspect may further comprise copper iodide, and the monovalent copper ion described above may be supplied from the copper iodide. As described above, the copper iodide generates $Cu^+$ ions and r ions. The $Cu^+$ ions not only show a catalyst effect in the oxygen generation reaction, but the iodine ions ($I^-$ ions) also form a LiI film on the surface of metal lithium functioning as the negative electrode, so that an effect of improving the cycle characteristics is obtained. Furthermore, the iodine ions are believed to also function as an oxygen generation catalyst. In particular, I⁻ ions are changed to $I^{3-}$ ions by oxidation, and ions function as the oxygen generation catalyst. Besides the catalyst effect by the copper ions, the catalyst effect by the iodine ions also contributes to the improvement in cycle characteristics.

In a fourth aspect of the present disclosure, for example, the copper iodide of the lithium air battery according to the third aspect may be supported by the positive electrode. In the case described above, the effect of promoting the decomposition of lithium peroxide can be directly obtained on the positive electrode.

In a fifth aspect of the present disclosure, for example, the nonaqueous lithium ion conductor of the lithium air battery according to the third or the fourth aspect may contain the copper iodide. When the copper iodide is contained in the nonaqueous lithium ion conductor, as is the case in which the copper iodide is supported by the positive electrode, the same effect as described above can also be obtained.

In a sixth aspect of the present disclosure, for example, the copper iodide may be dissolved in the nonaqueous lithium ion conductor of the lithium air battery according to the fifth aspect at a concentration of 0.01 mmol/liter or more. When the concentration of the copper iodide is appropriately controlled, the effect described above can be sufficiently obtained.

In a seventh aspect of the present disclosure, for example, the nonaqueous lithium ion conductor of the lithium air battery according to any one of the first to the sixth aspects may contain tetraethylene glycol dimethyl ether. Since tetraethylene glycol dimethyl ether is not likely to be evaporated and is stable to oxygen radicals, this ether compound is suitably used as an electrolyte liquid for air batteries.

In an eighth aspect of the present disclosure, for example, the nonaqueous lithium ion conductor of the lithium air battery according to any one of the first to the seventh aspects may contain dimethylsulfoxide. In dimethylsulfoxide, a compound, such as copper iodide, containing copper ions can be sufficiently dissolved.

Hereinafter, an embodiment of the present disclosure will be described with reference to the drawings. The present disclosure is not limited to the following embodiment.

As shown in FIG. 1, a lithium air battery 1 of this embodiment includes a battery case 11, a negative electrode 12, a positive electrode 13, and an electrolyte layer 14 functioning as a nonaqueous lithium ion conductor. The battery case 11 includes a cylindrical portion 11a having openings at an upper surface side and a bottom surface side, a bottom portion 11b provided so as to close the opening of the cylindrical portion 11a at a bottom surface side, and a lid portion 11c provided so as to close the opening of the cylindrical portion 11a at an upper surface side. In the lid portion 11c, air inlet holes 15 introducing the air in the battery case 11 are provided. The negative electrode 12 includes a negative electrode layer 12a disposed on an inner bottom surface of the bottom portion 11b of the battery case 11. The bottom portion 11b of the battery case 11 also has a function as a negative electrode collector of the negative electrode 12. That is, the negative electrode 12 is formed of the bottom portion 11b also functioning as the negative electrode collector and the negative electrode layer 12a. The positive electrode 13 is formed of a positive electrode layer 13a containing a carbon material and a positive electrode collector 13b disposed between the positive electrode layer 13a and the lid portion 11c of the battery case 11. The lithium air battery 1 may further include a separator contained in the electrolyte layer 14.

Battery reactions in the lithium air battery 1 having the structure as described above are as follows.

Discharge reaction (during use of the battery)

Negative electrode: $2Li \rightarrow 2Li^+ + 2e^-$ (A1)

Positive electrode: $2Li^+ + 2e^- + O_2 \rightarrow Li_2O_2$ (A2)

Charge reaction (during charge of the battery)

Negative electrode: $2Li^+ + 2e^- \rightarrow 2Li$ (A3)

Positive electrode: $Li_2O_2 \rightarrow 2Li^+ + 2e^- + O_2$ (A4)

During the discharge, as shown by the formulas (A1) and (A2), electrons and lithium ions are discharged from the negative electrode. When electrons are incorporated in the positive electrode, on the positive electrode, a lithium oxide is simultaneously generated by a reaction between oxygen incorporated from the outside of the battery and lithium ions, During the charge, as shown by the formulas (A3) and (A4), electrons and lithium ions are incorporated in the negative electrode. Electrons, lithium ions, and oxygen are discharged from the positive electrode. The charging catalyst is a material promoting the reaction shown by the formula (A4).

Next, the constituent elements of the lithium air battery 1 as described above will be described in detail.

1. Positive Electrode

As described above, the positive electrode 13 includes the positive electrode layer 13a and may also further include the positive electrode collector 13b. Hereinafter, the positive electrode layer 13a and the positive electrode collector 13b will be respectively described.

(Positive Electrode Layer)

The positive electrode layer 13a contains a material capable of performing oxidation and reduction of oxygen in the air which functions as a positive electrode active material. As the material described above, the positive electrode layer 13a of this embodiment contains an electrically conductive porous material containing carbon. A carbon material to be used as the electrically conductive porous material containing carbon may have a high electron conductivity. In particular, there may also be mentioned carbon materials, such as acetylene black and Ketjen black, which have been generally used as an electrically conductive auxiliary agent. Among those carbon materials, in view of the specific surface area and the size of primary particles, electrically conductive carbon black, such as Ketjen black, may be used. The carbon material is generally in the form of powder. The specific surface area of the carbon material is, for example, 800 to 2,000 $m^2/g$ and may also be 1,200 to 1,600 $m^2/g$. When the specific surface area of the carbon material is in the range as described above, the positive electrode layer 13a can be easily formed to have a pore structure. The specific surface area is a value measured by a BET method.

The lithium air battery 1 of this embodiment further includes copper ions. The valence of the copper ions is more than zero to less than two. The copper ions can be monovalent copper ions ($Cu^+$ ions). When the lithium air battery 1 is charged, a compound containing monovalent copper ions is oxidized on the surface of the electrically conductive porous material of the positive electrode 13, and the copper ions are changed to divalent copper ions ($Cu^{2+}$ ions). The divalent copper ions function as the charging catalyst promoting the decomposition of lithium peroxide.

As the compound containing copper ions to be used as a copper ion source, any compound may be used as long as being solvated in an electrolyte liquid so that anionic ligands are freed, and $Cu^+$ ions can be stably present. As the compound containing copper ions, for example, a halogenated copper may be mentioned. As the halogenated copper, copper iodide may be mentioned. In the case described above, the monovalent copper ions are supplied from the copper iodide.

When copper iodide is used as the compound containing copper ions, $Cu^+$ ions not only show a catalyst effect in the oxygen generation reaction, but iodine ions ($I^-$ ions) also form a LiI film on the surface of metal lithium functioning as the negative electrode 12. By the LiI film, the surface of the negative electrode 12 is smoothed, and lithium is likely to be precipitated and dissolved. When, the precipitation and the dissolution of lithium are likely to occur on the negative electrode 12, the growth of lithium dendrites which may probably cause short circuit is suppressed, and the cycle characteristics of the lithium air battery 1 are improved. Furthermore, the iodide ions are believed to also function as the oxygen generation catalyst. In particular, $I^-$ ions are changed into $I^{3-}$ ions, and $I^{3-}$ ions function as the oxygen generation catalyst. Besides the catalyst effect by the copper ions, the catalyst effect by the iodine ions also contributes to the improvement in cycle characteristics.

The compound containing copper ions is supported by the positive electrode 13. In this case, the effect of promoting the decomposition of lithium peroxide can be directly obtained on the positive electrode 13. For example, particles of the compound containing copper ions are contained in the positive electrode 13. In particular, the particles of the compound containing copper ions are supported by an electrically conductive porous material forming the positive electrode 13. When the compound containing copper ions is copper iodide, particles of the copper iodide are supported by the electrically conductive porous material forming the positive electrode 13.

The ratio (M2/M1) of mass M2 of the compound containing copper ions to mass M1 of the electrically conductive porous material forming the positive electrode 13 may be, for example, in a range of 0.01 to 0.9, a range of 0.1 to 0.7, or a range of 0.3 to 0.5.

As described below, when the compound containing copper ions is dissolvable in an electrolyte liquid, the compound may be dissolved in the electrolyte liquid. In this case, the compound containing copper ions may be contained in the positive electrode layer 13a or may not be contained therein. The copper ions are present in at least one selected from the positive electrode 13 and the nonaqueous lithium ion conductor.

The positive electrode layer 13a may further contain a binder fixing the above electrically conductive porous material. As the binder, a material known as a binder of the positive electrode layer 13a of the lithium air battery 1 may be used. As the binder, for example, a poly(vinylidene fluoride) (PVdF) or a polytetrafluoroethylene (PTFE) may be mentioned. The content of the binder in the positive electrode layer 13a is not particularly limited, and for example, the content is in a range of 1 to 40 percent by mass.

Since being changed depending on the application of the lithium air battery 1, the thickness of the positive electrode layer 13a is not particularly limited. The thickness of the positive electrode layer 13a is, for example, in a range of 2 to 500 μm and may be in a range of 5 to 300 μm.

The positive electrode layer 13a may be formed, for example, by the following method. A solvent is added to a composition containing a carbon material and a charging catalyst powder and is then mixed therewith. If needed, additives, such as a binder, may also be contained in the composition. The mixture (coating liquid) thus obtained is applied on the positive electrode collector 13b by an application method, such as a doctor blade method, and is then dried. Accordingly, the positive electrode 13 is obtained. A sheet-shaped positive electrode layer 13a may be formed without using the positive electrode collector 13b in such a way that after the coating film of the mixture is dried, the coating film thus dried is rolled by a roll press method or the like. The sheet-shaped positive electrode layer 13a may also be formed by performing a compression press directly on the composition described above.

(Positive Electrode Collector)

The positive electrode collector 13b is a member collecting electrical charges of the positive electrode layer 13a. As long as having an electrical conductivity, a material of the positive electrode collector 13b is not particularly limited. As the material of the positive electrode collector 13b, for example, there may be mentioned stainless steel, nickel, aluminum, iron, titanium, or carbon. As the shape of the positive electrode collector 13b, for example, there may be mentioned a foil shape, a plate shape, or a mesh (grid) shape. Among those shapes mentioned above, in this embodiment, the positive electrode collector 13b may have a mesh shape. The reason for this is that a mesh-shaped positive electrode collector 13b is excellent in current collecting efficiency. In the case described above, the mesh-shaped positive electrode collector 13b may be disposed in the positive electrode layer 13a. Furthermore, the lithium air battery 1 according to this embodiment may further include another positive electrode collector (such as a foil-shaped collector) collecting electrical charges collected by the mesh-shaped positive electrode collector 13b. In this embodiment, the battery case 11 which will be described later may also have a function of the positive electrode collector. The thickness of the positive electrode collector 13b is, for example, in a range of 10 to 1,000 μm and may be in a range of 20 to 400 μm.

2. Negative Electrode

As described above, the negative electrode 12 includes the negative electrode collector and may further include the negative electrode layer 12a. Hereinafter, the negative electrode layer 12a and the negative electrode collector will be respectively described.

(Negative Electrode Layer)

The negative electrode layer 12a of this embodiment may contain a negative electrode active material capable of occluding and releasing lithium ions. As the negative electrode active material described above, any material containing a lithium element may be used, and for example, there may be mentioned metal lithium, which is a metal element, an alloy containing a lithium element, an oxide containing a lithium element, or a nitride containing a lithium element. As the alloy containing a lithium element, for example, there may be mentioned a lithium aluminum alloy, a lithium tin alloy, a lithium lead alloy, or a lithium silicon alloy. As the metal oxide containing a lithium element, for example, a lithium titanium oxide may be mentioned. As the metal nitride containing a lithium element, for example, there may be mentioned a lithium cobalt nitride, a lithium iron nitride, or a lithium manganese nitride.

The negative electrode layer 12a may contain only a negative electrode active material or may also contain a binder besides the negative electrode active material. When the negative electrode active material is in the form of foil, the negative electrode layer 12a may contain only the negative electrode active material. When the negative electrode active material is in the form of powder, the negative electrode layer 12a may contain the negative electrode active material together with a binder. As the binder, a material known as a binder of a negative electrode layer of a lithium air battery may be used, and for example, a PVdF or a PTFE may be mentioned. The content of the binder in the negative electrode layer 12a is not particularly limited and may be, for example, in a range of 1 to 40 percent by mass. As a method for forming the negative electrode layer 12a using a powdered negative electrode active material, as is the above method for forming the positive electrode layer 13a, for example, a doctor blade or a formation method using a compression press may be used.

(Negative Electrode Collector)

The negative electrode collector is a member collecting electrical charges of the negative electrode layer 12a. As a material of the negative electrode collector, any material having an electrical conductivity may be used. A material known as a negative electrode collector of a lithium air battery may be used. As the material of the negative electrode collector, for example, there may be mentioned copper, stainless steel, nickel, or carbon. As the shape of the negative electrode collector, for example, a foil shape, a plate shape, or a mesh (grid) shape may be mentioned. The negative electrode collector may also be a porous material having an irregular surface. The battery case 11 which will be described later may also have a function of the negative electrode collector.

3. Separator

The lithium air battery 1 of this embodiment may include a separator disposed between the positive electrode 13 and the negative electrode 12. Since the separator is disposed between the positive electrode 13 and the negative electrode 12, a highly safe battery can be obtained. As long as having a function to separate the positive electrode layer 13a from the negative electrode layer 12a, the separator is not particularly limited. As the separator, for example, there may be mentioned a porous film, such as a polyethylene (PE) porous film or a polypropylene (PP) film, a resin non-woven cloth, such as a PE non-woven cloth or a PP non-woven cloth, a glass fiber non-woven cloth, or a porous insulating material, such as a paper-made non-woven cloth.

The porosity of the separator is, for example, in a range of 30% to 90%. When the porosity is in the range as described above, a sufficient amount of the electrolyte can be held in the separator, and in addition, the separator has a sufficient strength. The range of the porosity of the separator may also be 35% to 60%. The porosity can be calculated from the true density, the total volume including pores, and the weight of the material.

4. Electrolyte Layer

The electrolyte layer 14 is disposed between the positive electrode 13 and the negative electrode 12 and is a layer responsible for conduction of lithium ions. As long as the electrolyte layer 14 is a lithium ion conductor having a lithium ion conductivity, the form of the electrolyte layer 14 is not particularly limited, and either a solution system represented by an organic solvent system containing a lithium salt as an electrolyte or a solid film system represented by a high molecular weight solid electrolyte system containing a lithium salt may be used.

When the electrolyte layer is the solution system, a nonaqueous electrolyte liquid prepared by dissolving a lithium salt in a nonaqueous solvent may be used as the electrolyte layer 14.

The electrolyte layer 14 may contain a compound containing copper ions. The compound containing copper ions is dissolved, for example, in the nonaqueous electrolyte liquid. In this case, the nonaqueous solvent of the nonaqueous electrolyte liquid is able to dissolve the compound containing copper ions. The valence of the copper ions is more than 0 to less than two. The copper ions can be monovalent copper ions. When the lithium air battery 1 is charged, the compound containing monovalent copper ions is oxidized on the surface of the positive electrode 13, and the monovalent copper ions are changed into divalent copper ions. The divalent copper ions function as the charging catalyst promoting the decomposition of lithium peroxide.

As the compound containing copper ions, as is the case in which the compound is supported by the positive electrode 13, a halogenated copper, such as copper iodide, may be mentioned. In particular, copper iodide is recommended. Even if dissolved in the nonaqueous electrolyte liquid, the copper iodide also shows the same effect as that obtained when being supported by the positive electrode 13.

The halogenated copper, such as copper iodide, is dissolved in the nonaqueous electrolyte liquid, for example, at a concentration of 0.01 mmol/liter or more. The upper limit of the concentration of the halogenated copper in a nonaqueous electrolyte liquid is, for example, 200 mmol/liter. When the concentration of the halogenated copper is appropriately controlled, the effect described above can be sufficiently obtained.

As the lithium salt contained in the nonaqueous electrolyte liquid as an electrolyte, for example, although lithium perchlorate ($LiCLO_4$), lithium hexafluorophosphate ($LiPF_6$), lithium tetrafluoroborate ($LiBF_4$), lithium trifluoromethanesulfonate ($LiCF_3SO_3$), or lithium bistrifluoromethanesulfonylamide ($LiN(CF_3SO_2)_2$) may be mentioned, the lithium salt is not limited thereto. A lithium salt known as an electrolyte of a nonaqueous electrolyte liquid of a lithium air battery may be used.

The concentration of the electrolyte in the nonaqueous electrolyte liquid is, for example, 0.5 to 2.5 mol/liter. When the nonaqueous electrolyte liquid, which is the solution system electrolyte layer 14, is used, as described above, the electrolyte layer 14 can be formed in such a way that this nonaqueous electrolyte liquid is impregnated and held in the separator.

As the nonaqueous solvent, nonaqueous solvents each known as a nonaqueous solvent of a nonaqueous electrolyte liquid of a lithium air battery may be used. Among the solvents, a chain ether, such as tetraethylene glycol dimethyl ether or tetraethylene glycol diethyl ether, may be used as the solvent. Compared to a carbonate solvent, the chain ether is not likely to cause a side reaction other than the redox reaction of oxygen in the positive electrode 13. Since the chain ether is not likely to be evaporated and is stable to oxygen radicals, this compound is suitably used as an electrolyte liquid for an air battery. As another preferable nonaqueous solvent, for example, dimethylsulfoxide may be mentioned. In dimethylsulfoxide, the compound, such as copper iodide, containing copper ions can be sufficiently dissolved.

5. Battery Case

The battery case 11 of the lithium air battery 1 of this embodiment is not particularly limited as long as being capable of receiving the positive electrode 13, the negative electrode 12, and the electrolyte layer 14 described above. The shape of the battery case 11 of the lithium air battery 1 of this embodiment is not limited to the shape shown in FIG. 1, and various shapes, such as a coin shape, a flat plate shape, a cylindrical shape, and a laminate shape, may be used. The battery case 11 may be either an air-open type battery case or a closed type battery case. The air-open type battery case is a case having a vent hole through which air flows back and forth so as to be brought into contact with the positive electrode. When the closed type battery case is used, the closed type battery case may be provided with a gas supply pipe and a gas exhaust pipe. In the case described above, the gas to be supplied and to be exhausted may be a dried gas, the oxygen concentration thereof may be high, and pure oxygen (oxygen concentration: 99.99%) may also be used. The oxygen concentration during discharge may be high, and the oxygen concentration during charge may be low.

EXAMPLES

Hereinafter, the present disclosure will be described in more detail with reference to examples. In addition, the following examples will be described by way of example, and the present disclosure is not limited to the examples.

Example 1

As a carbon material, a powder of Ketjen black (manufactured by Lion Corporation) was used. As a binder, a PTFE powder (manufactured by Daikin Industries, Ltd.) was used. The carbon material, a copper iodide (CuI) powder, and the binder were kneaded together at a mass ratio of 40:15:10 using an ethanol solvent, so that a mixture was obtained. The mixture thus obtained was rolled by a roll press to form an electrode sheet. The electrode sheet thus obtained was cut into a positive electrode (positive electrode layer).

Lithium bistrifluoromethanesulfonylamide (LiTFSA, manufactured by Kishida Chemical Co., Ltd.) was mixed with and dissolved in tetraethylene glycol dimethyl ether (TEGDME, manufactured by Kishida Chemical Co., Ltd.) to have a concentration of 1 mol/liter. The mixed solution thus obtained was stirred for 24 hours in a dry air atmosphere at a dew point of −50° C. or less, so that a nonaqueous electrolyte liquid was obtained.

As a separator, a glass fiber separator was prepared. A SUS304 mesh (manufactured by The Nilaco Corporation) as a collector was adhered to metal lithium foil (manufactured by The Honjo Chemical Corporation), so that a negative electrode was obtained, By the use of the positive electrode, the separator, the nonaqueous electrolyte liquid, and the negative electrode, a lithium air battery having the structure shown in FIG. 1 was formed.

Comparative Example 1

Except for that CuI was not used, by the same method as that of Example 1, a lithium air battery of Comparative Example 1 was formed.

(Charge/Discharge Test)

Figure 2:
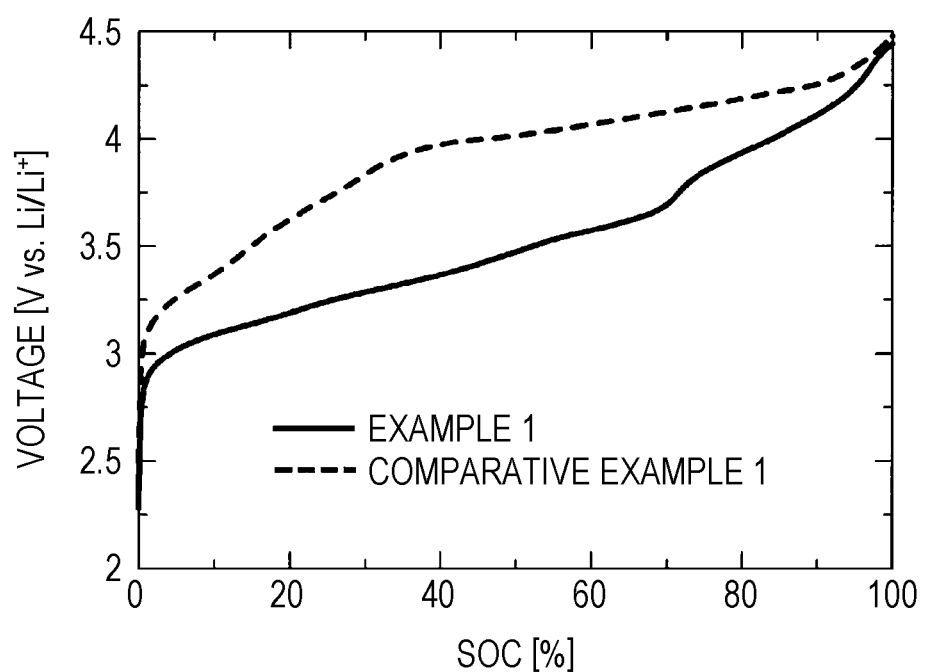
FIG. 2 is a graph showing a charging curve of a lithium air battery according to each of Example 1 and Comparative Example 1.

After the lithium air batteries of Example 1 and Comparative Example 1 were each held for 20 minutes in an oxygen atmosphere, a charge/discharge test was performed, A current density during discharge was 0.4 mA/cm$^2$, and a cut-off voltage was 2.0 V. A current density during charge was 0.1 mA/cm$^2$; and a cut-off voltage was 4.5 V. After the discharge was performed, the charge was performed, A charging curve obtained thereby is shown in FIG. 2. SOC (State of Charge) along the horizontal axis in FIG. 2 represents a charging rate.

As shown in FIG. 2, a charging potential of the lithium air battery of Example 1 was lower than that of the lithium air battery of Comparative Example 1. The reason the charging potential is lowered in Example 1 is believed that since CuI contained in the positive electrode was solvated, iodide ions were freed, $Cu^+$ ions were changed into $Cu^{2+}$ ions by oxidation on the surface of the positive electrode, and $Cu^{2+}$ ions functioned as a charging catalyst which efficiently decomposed lithium peroxide. According to the technique of the present disclosure, since application of a high voltage to each member of the lithium air battery can be avoided, degradation of the member caused by oxidation can be suppressed.

(Charge/Discharge Cycle Test)

Figure 3:
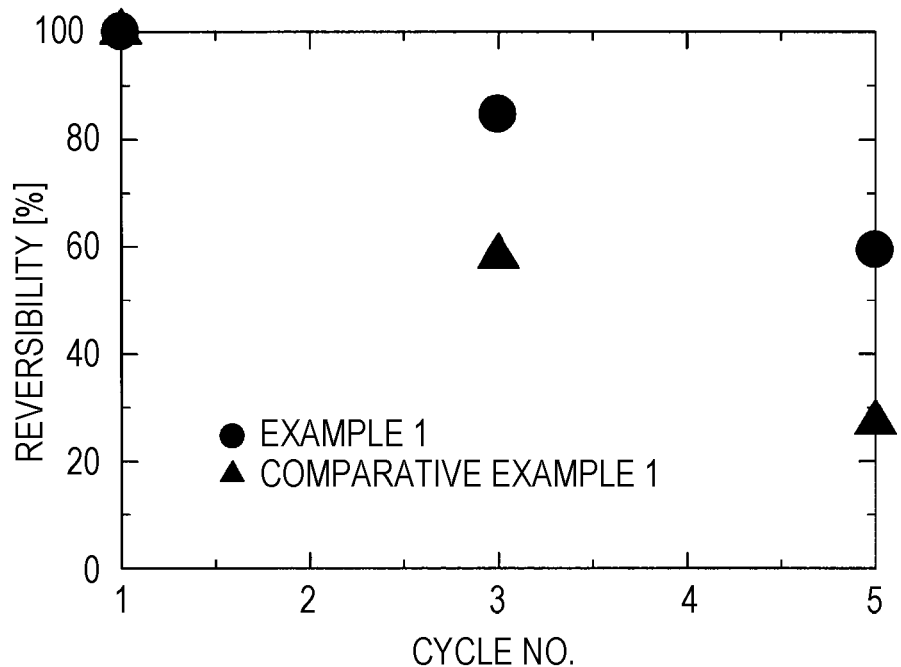
FIG. 3 is a graph showing cycle characteristics of the lithium air battery according to each of Example 1 and Comparative Example 1.

Under the same conditions as described above, a charge/discharge cycle test of the lithium air battery of each of Example 1 and Comparative Example 1 was performed. In particular, charge and discharge were each repeatedly performed 5 times. The results are shown in FIG. 3. In FIG. 3, the horizontal axis represents the number of cycles. The vertical axis represents the rate of the discharge capacity at each cycle to the discharge capacity at the first cycle.

As shown in FIG. 3, compared to the lithium air battery of Comparative Example 1, the capacity of the lithium air battery of Example 1 was not likely to decrease. In the lithium air battery of Example 1, it is believed that $Cu^+$ ions functioned as a charging catalyst which efficiently decomposed lithium peroxide. Furthermore, it is also believed that iodide ions ($I^-$ ions) formed a LiI film on the surface of metal lithium functioning as the negative electrode, and that the decrease in capacity was suppressed by this LiI film. In particular, the surface of the negative electrode is smoothed by the LiI film, and precipitation and dissolution of lithium are likely to occur. When the precipitation and the dissolution of lithium are likely to occur on the negative electrode, the growth of lithium dendrites which may probably cause short circuit is suppressed, and as a result, the cycle characteristics of the lithium air battery are improved.

Example 2

The same carbon material and the same binder as those in Example 1 were kneaded together at a mass ratio of 90:10 using an ethanol solvent, so that a mixture was obtained. The mixture was rolled by a roll press, so that an electrode sheet was formed. The electrode sheet thus obtained was cut, so that a positive electrode (positive electrode layer) was obtained.

Dimethylsulfoxide and tetraethylene glycol dimethyl ether were mixed at a volume ratio of 1:3, so that a mixed solvent was obtained. LiTFSA was mixed with and dissolved in this mixed solvent to have a concentration of 1 mol/l. This mixed solution was stirred for 24 hours in a dry air atmosphere at a dew point of −56° C. or less to obtain a nonaqueous electrolyte liquid. In the nonaqueous electrolyte liquid thus obtained, CuI was dissolved at a concentration of 20 mmol/liter.

As the separator, a glass fiber separator was prepared. A SUS304 mesh as a collector was adhered to metal lithium foil to form a negative electrode. By the use of the positive electrode, the separator, the nonaqueous electrolyte liquid, and the negative electrode, a lithium air battery having the structure shown in FIG. 1 was formed.

Comparative Example 2

Except for that a nonaqueous electrolyte liquid containing no CuI was used, by the same method as that of Example 2, a lithium air battery of Comparative Example 2 was formed.

(Charge/Discharge Test)

Figure 4:
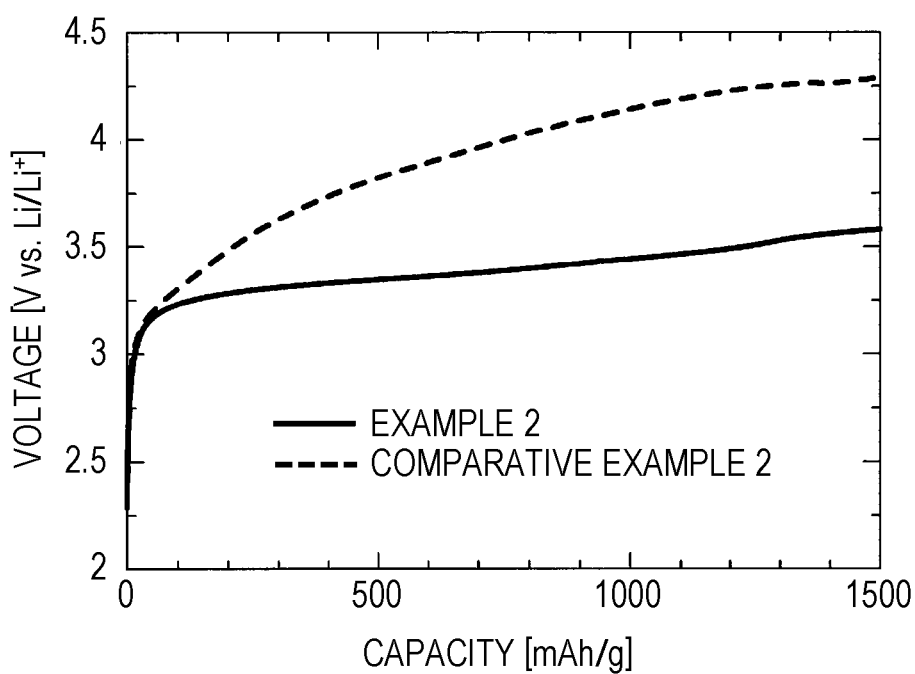
FIG. 4 is a graph showing a charging curve of a lithium air battery according to each of Example 2 and Comparative Example 2.

Under the same conditions as those of Example 1, a charge/discharge test of the lithium air battery of each of Example 2 and Comparative Example 2 was performed. A charging curve obtained thereby is shown in FIG. 4. The horizontal axis of FIG. 4 represents a charge capacity.

As shown in FIG. 4, a charging potential of Example 2 was lower than that of Comparative Example 2. In Example 2, it is believed that since $Cu^+$ ions contained in the nonaqueous electrolyte liquid were changed to $Cu^{2+}$ ions by oxidation on the surface of the positive electrode, and $Cu^{2+}$ ions functioned as a charging catalyst which efficiently decomposed lithium peroxide, the charging potential is lowered. According to the technique of the present disclosure, since application of a high voltage to each member of the lithium air battery can be avoided, degradation of the member caused by oxidation can be suppressed.

As apparent from the results of Examples 1 and 2, when copper ions functioning as the charging catalyst is contained in one of the positive electrode and the electrolyte liquid, the catalyst effect can be obtained. If being not likely to be dissolved in the electrolyte liquid, the charging catalyst can be supported by the positive electrode. If being likely to be dissolved in the electrolyte liquid, the charging catalyst can be dissolved in the electrolyte liquid.

What is claimed is:

1. A lithium air battery comprising:
   a negative electrode allowing a lithium ion to be occluded in the negative electrode and released from the negative electrode;
   a positive electrode configured to use oxygen in air as a positive electrode active material;
   a nonaqueous lithium ion conductor disposed between the negative electrode and the positive electrode; and
   a copper ion present in at least one selected from the group consisting of the positive electrode and the nonaqueous lithium ion conductor, wherein
   the positive electrode is directly in contact with the nonaqueous lithium ion conductor.

2. The lithium air battery according to claim 1, wherein the copper ion is a monovalent copper ion.

3. The lithium air battery according to claim 2, further comprising copper iodide,
   wherein the monovalent copper ion is supplied from the copper iodide.

4. The lithium air battery according to claim 3, wherein the copper iodide is supported by the positive electrode.

5. The lithium air battery according to claim 3, wherein the nonaqueous lithium ion conductor contains the copper iodide.

6. The lithium air battery according to claim 5, wherein the copper iodide is dissolved in the nonaqueous lithium ion conductor at a concentration of 0.01 mmol/liter or more.

7. The lithium air battery according to claim 1, wherein the nonaqueous lithium ion conductor contains tetraethylene glycol dimethyl ether.

8. The lithium air battery according to claim 1, wherein the nonaqueous lithium ion conductor contains dimethylsulfoxide.

* * * * *